Nov. 7, 1961 G. R. ASCHAUER 3,007,562
HYDRAULICALLY ACTUATED FRICTION CLUTCH
Filed Oct. 2, 1956 2 Sheets-Sheet 2
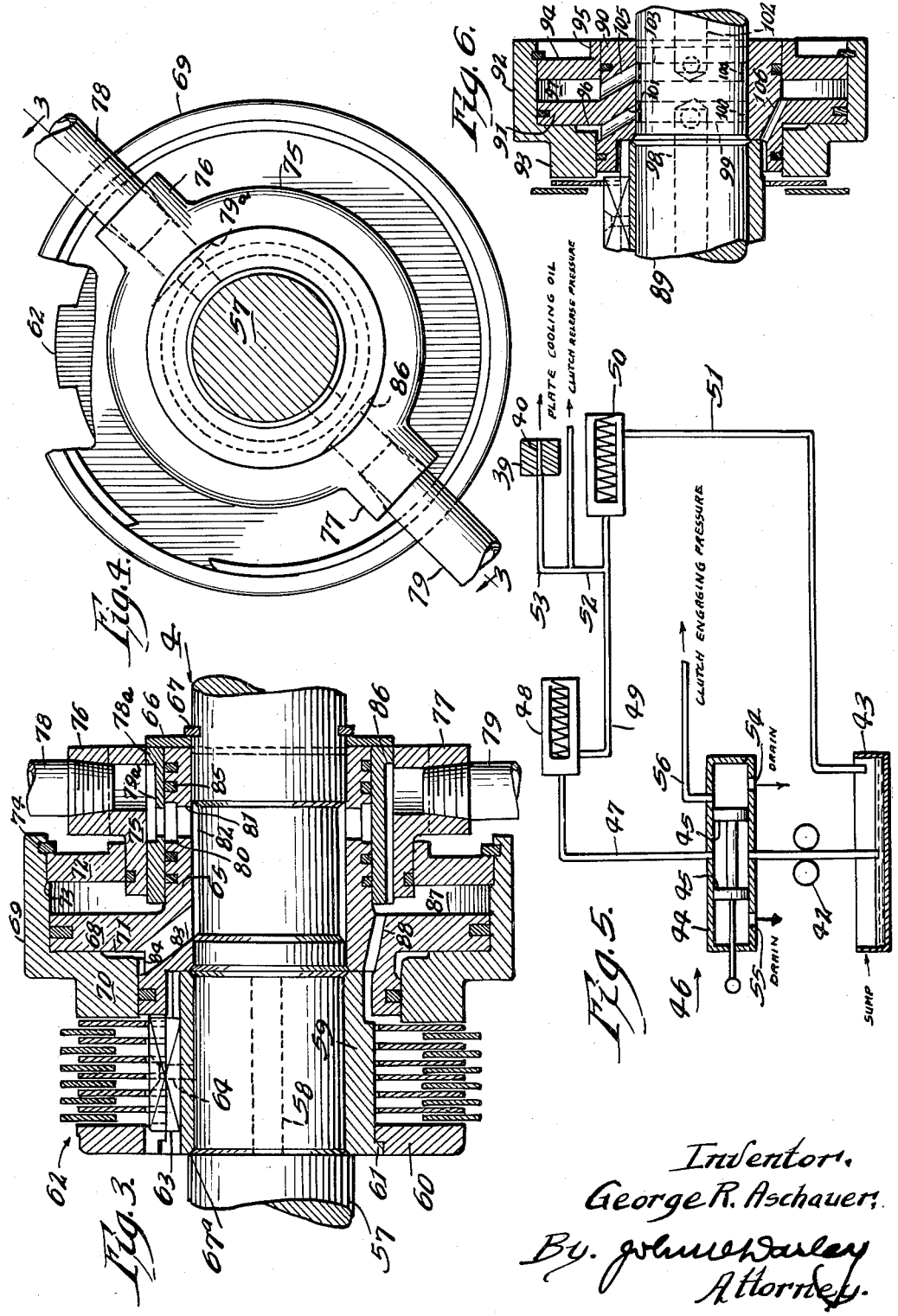
Inventor:
George R. Aschauer,
By. John McDarley
Attorney.

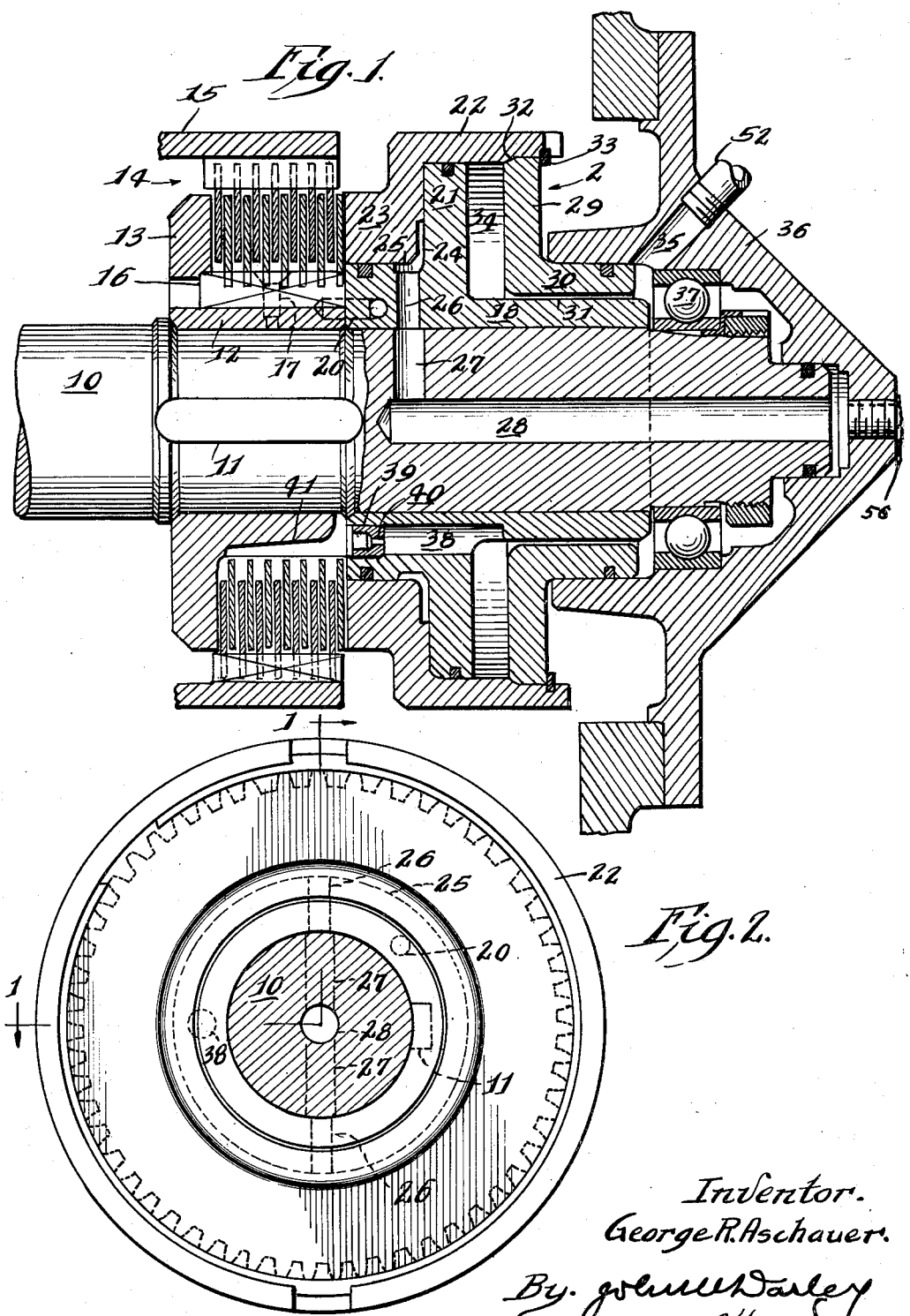

United States Patent Office 3,007,562
Patented Nov. 7, 1961

3,007,562
HYDRAULICALLY ACTUATED FRICTION CLUTCH
George R. Aschauer, Racine, Wis., assignor to Twin Disc Clutch Company, Racine, Wis., a corporation of Wisconsin
Filed Oct. 2, 1956, Ser. No. 613,485
10 Claims. (Cl. 192—113)

My invention relates to hydraulically actuated, friction clutches which are characterized by a simplicity of design that is reflected in reduced manufacturing cost.

One object of the invention is to provide a clutch of the indicated type in which the friction plates are hydraulically shifted to engaged and released positions to thereby eliminate the necessity for relatively costly release springs which are prone to heat deterioration under conditions of severe usage.

A further object is to provide a clutch as above employing oil as the hydraulic medium in which the releasing oil pressure is maintained constantly at a substantially lower value than the engaging pressure and in which a part of the release oil supply is directed to bathe the clutch plates for cooling in engaged and released positions of the clutch.

These and further objects of the invention will be set forth in the following specification, reference being had to the accompanying drawings, and the novel means by which the objects are effectuated will be definitely pointed out in the claims.

In the drawings:

FIG. 1 is a sectional elevation of one form of the clutch in release position as taken along the line 1—1 in FIG. 2.

FIG. 2 is an end view of the clutch looking in the direction of the arrow 2 in FIG. 1, the end plate being removed.

FIG. 3 is a sectional elevation of a modified clutch, also in release position and as taken along the line 3—3 in FIG. 4.

FIG. 4 is an end view looking in the direction of the arrow 4 in FIG. 3.

FIG. 5 is a schematic view, partly in section, showing the hydraulic control circuit for either type of clutch.

FIG. 6 is a fragmentary, reduced, sectional elevation showing a suggested arrangement for supplying oil pressure from the opposite ends of the shaft of the FIG. 3 clutch.

Referring to FIGS. 1 and 2, there is shown one form of the improved clutch which is more particularly intended for use in a variety of industrial applications as typified by road rollers, fork lift trucks, marine gears, coal cutting machines, etc.

The numeral 10 designates, by way of example, an input shaft that is connectible to a power source, although power flow may occur in the opposite direction. Keyed at 11 to the shaft 10 is a hub 12 having preferably integrally formed at one end thereof an annular flange constituting a back plate 13 which serves as an abutment against which a plurality of clutch plates, generally indicated by the numeral 14, are gripped by means presently described. Alternate clutch plates have driving connection with a driven member 15, while the intervening plates have toothed connection with a plurality of keys 16, only one being shown, each key being fastened to the hub 12 by a screw 17.

Also carried by the shaft 10 is a sleeve 18 whose left end, as viewed in FIG. 1, abuts the hub 12 and a pin 20 extending between the abutting surfaces of the hub 12 and sleeve 18 serves to register certain passages in the shaft 10 and sleeve 18 as presently described, and to provide a driven connection with the hub 12. An annular flange 21 projects from the sleeve 18 intermediate the ends thereof and slidable on the peripheral surface of the flange 21 in sealed relation thereto is a shell 22. The left end of the shell 22 is reduced in diameter and shaped to provide a pressure ring 23 for engaging the clutch plates 14. The ring 23 has sealed and relatively sliding relation to the adjacent portion of the sleeve 18 and defines in conjunction with this sleeve, the flange 21 and shell 22 an annular cylinder 24. Oil under selective control and pressure sufficient to engage the plates is fed to the cylinder 24 through an annular channel 25 in the adjacent periphery of the sleeve 18 which connects with diametrically opposite passages 26—26 whose inner ends constantly communicate with radial passages 27—27 in the shaft 10 that connect with one end of an axial passage 28 whose opposite end terminates at the right end of the shaft 10.

The opposite end of the shell 22 carries internally thereof an annular flange 29 which is integrally formed with a sleeve 30 that is coaxial with the sleeve 18 and spaced therefrom to define an annular passage 31. The flange 29 and hence the sleeve 30 is fast to the shell 22 for axial movement therewith by having the flange 29 fixed between a shoulder 32 provided internally of the shell 22 and a locking ring 33 inset in this shell and abutting the flange 29. The sleeve 18, flanges 21 and 29, and the shell 22 together define an annular cylinder 34 for receiving the releasing pressure oil which is fed thereto through the annular passage 31 whose inlet end connects with a passage 35 included in a fixed end plate 36 that normally forms a part of the equipment with which the clutch is associated. Expressed in other words, the shell 22, ring 23 and flange 29 constitute a cylinder slidable relative to a fixed piston constituted by the flange 21, the end walls of the slidable cylinder being provided by the ring 23 and flange 29. The end plate 36 has sealing relation with the adjacent end of the shaft 10 and with the sleeve 30, all as shown, and may carry a bearing 37 for piloting the end of the shaft 10.

The release cylinder also communicates with one end of a longitudinal passage 38 in the sleeve 18 and mounted in the delivery end of this passage is a plug 39 which includes a throttling passage 40 of such a size as not to disturb the maintenance of a constant releasing oil pressure in the cylinder 34 as presently described. Oil flowing through the restricted passage 40 is delivered to a chamber 41 provided around the hub 12 and which communicates with the inner edges of the clutch plates 14. While the chamber 41 is interrupted by the keys 16, the latter do not prevent the radial throw of the oil over the plates 14 by centrifugal action and with consequent cooling whether the clutch is engaged or disengaged.

In the operation of the clutch and generally speaking, a constant, releasing oil pressure is maintained in the cylinder 34 and whenever it is desired to engage the clutch, a substantially higher engaging pressure is supplied to the cylinder 24 which overrides the lower releasing pressure. To disengage the clutch, the engaging pressure is interrupted whereupon the releasing oil pressure becomes active. The instrumentalities for accomplishing this result are schematically shown in FIG. 5 to which reference will now be made.

A suitably driven pump 42 withdraws oil from a convenient sump 43 and constantly delivers to that part of a casing 44 included between spaced, connected pistons 45—45 which are reciprocable therein and constitute a control valve 46. The inlet end of a pipe 47 also connects at all times to the casing 44 between the pistons 45 and the opposite end connects with the inlet end of a typical, pressure regulating valve 48 whose outlet connects through a pipe 49 with the inlet of a second, pressure regulating valve 50 and the outlet of the latter valve connects by a pipe 51 with the sump 43. A pipe 52 provides a connection between the pipe 49 anterior to the valve 50 and the passage 35 (see FIG. 1) leading to the release cylinder 34. The throttling passage 40 also connects by a pipe 53 with the pipe 52, the former pipe schematically corresponding to the passage 38 in FIG. 1. A drain port 54 connects that part of the casing 44 which always lies to the right of the right hand piston 45 with the sump 43 and a similar drain port 55 always connects that part of the casing 44 which lies to the left of the left hand piston 45 with the sump 43. Further, a pipe 56 connects the right end of the casing 44 with the passage 28 (see FIG. 1) leading to the clutch engaging cylinder 24.

In the position of the control valve 46 shown in FIG. 5, the pipe 56 connects with the drain port 54 so that pressure does not exist in the cylinder 24, but pump pressure is effective in the pipe 47 under the regulation of the valve 48 which will be assumed as set at 150 p.s.i., by way of example. The oil discharged from the valve 48 is pressure regulated by the valve 50 which will be assumed as set at 15 p.s.i. and this pressure will be effective in the cylinder 34 so that the clutch is in the release position shown in FIG. 1. At the same time, oil is flowing through the passages 38 (pipe 53 in FIG. 5) and 40 and thence over the clutch plates 14 for cooling.

To engage the clutch, the control valve 46 is actuated to shift the pistons 45—45 towards the right until the right hand piston 45 uncovers the inlet end of the pipe 56 and breaks connection of the latter with the drain port 54. In this position of the control valve 46, the portion of the casing 44 between the pistons 45—45 remains in communication with the pump 42 and the pipe 47 so that oil pressure at the assumed 150 p.s.i. is effective in the cylinder 24 to thereby shift the pressure ring 23 to clutch engaging position. This shift is accomplished against the lower pressure in the cylinder 34 which is maintained constantly so that in the engaged position, there is a stream of oil flowing over the clutch plates. When the valve 46 is returned to the position shown in FIG. 5, pressure in the cylinder 24 is exhausted through the drain port 54 and the clutch is released.

In the above operations, the pressure ring 23 and flange 29 act as pistons which are connected for simultaneous movement by the shell 22.

In some installations, it is desirable to use this type of clutch, but the nature of the associated unit, such as some machine tools, for example, precludes supplying the oil through the end of the clutch shaft and necessitates a collector ring arrangement for this purpose as shown in FIGS. 3 and 4.

Referring to FIG. 3, the clutch end of the structure is generally similar to FIG. 1 in that it includes an input shaft 57 keyed at 58 to a hub 59 which at its left end carries a back plate 60, the latter being separate from the hub 59 and having a shoulder connection 61 therewith to restrain its axial movement when the clutch is engaged. A plurality of clutch plates 62 encircle the hub 59, alternate plates having toothed connection with a driven member (not shown) in the usual manner while the intervening plates have like connection with a plurality of keys 63 spaced around the hub 59, only one key being shown and each key being attached to the hub by a screw 64.

A sleeve 65 is secured to the shaft 57 in any approved manner with one end abutting the adjacent end of the hub 59 and is axially held in this position by a retaining ring 66 which abuts the opposite end of the sleeve 65 and is held by a lock ring 67 set in the shaft 57, the sleeve 65 thus holding the hub 59 against a shoulder 67a on the shaft 57. Intermediate its ends, the sleeve 65 carries an annular flange 68 whose peripheral surface has sealing and relative sliding contact with a shell 69 and whose left end extends inwardly and is shaped to provide a pressure ring 70 for engaging the clutch plates 62. The ring 70 has sealing relation to the adjacent portion of the sleeve 65 and defines therewith, the flange 68 and shell 69 an annular, clutch engaging cylinder 71.

Also carried by the shell 69 and on the opposite side of the flange 68 from the pressure ring 70 is a ring 72 whose outer peripheral surface fits the interior of the shell 69 and which is axially held against a shoulder 73 in the shell by a lock ring 74 set therein. The inner peripheral surface of the ring 72 has sealing and relative sliding contact with the outer peripheral surface of an annular yoke 75 having diametrically opposed bosses 76 and 77 to which are connected the delivery ends of pipes 78 and 79 for carrying the clutch engaging and releasing oil pressures, all respectively.

Fitting between the yoke 75 and sleeve 65 is a sleeve 78a, a part of whose outer peripheral surface is milled to provide a channel 79a which provides communication between the delivery end of the pipe 78 and an annular channel 80 formed in the outer surface of the sleeve 65. The channel 80 connects successively through a radial passage 81 in the sleeve 65, an annular passage 82 formed by recessing a convenient length of the shaft 57, a passage 83 and an annular channel 84 with the clutch engaging cylinder 71, the passage 83 and channel 84 being formed in the sleeve 65. Suitable ring seals 85 may be recessed in the sleeve 65 on opposite sides of the channel 80.

The delivery end of the release oil pipe 79 communicates through a channel 86, also milled in the outer peripheral surface of the sleeve 78a with an annular, clutch release cylinder 87 included between the cooperating parts of the flange 68, shell 69, ring 72 and the adjacent ends of the yoke 75 and sleeve 78a. Leading from the cylinder 87 and located in the sleeve 65 is a throttling passage 88 which delivers oil to the inner periphery of the clutch plates 62 at all times.

The operation of the FIG. 3 clutch is identical with that shown in FIG. 1, the rings 70 and 72 also acting as pistons that are connected for simultaneous movement, and is in accordance with the schematic of FIG. 5, the essential difference residing in the ring collector type of oil feed.

A further method of supplying engaging and releasing pressure oil to the two cylinders of the FIG. 3 clutch which omits the collector ring structure and provides for oil supply from the opposite ends of the clutch shaft is shown in FIG. 6 to which reference will now be made.

The input shaft 89 has attached thereto a sleeve 90 having an annular flange 91 extending therefrom whose peripheral surface has sealed and relative sliding contact with a shell 92 provided with a reduced end constituting a pressure ring 93 which is engageable with a clutch plate structure as shown in FIG. 3. The opposite end of the shell 92 fixedly carries the outer portion of an annular flange 94 that extends from a sleeve 95 slidable on the sleeve 90. The ring 93 and flange 94 define with the flange 91, shell 92 and sleeve 90 clutch engaging and release cylinders 96 and 97, respectively.

Oil supply to the cylinder 96 is successively through an axial passage 98 in the shaft 89 from the left end thereof, radial passages 99 also in the shaft which communicate with an annular channel 100 on the surface of the shaft, and one or more passages 101 in the sleeve 90 leading to the cylinder 96. A similar axial passage 102 extends from the right end of the shaft 89 and connects successively through radial passages 103 in and an annular channel 104 on the surface of the same shaft, and a passage 105 in the sleeve 90 leading to the release cylinder 97. A passage 106 in the sleeve 90 conducts plate cooling oil from the cylinder 97 to the clutch plates as already described. Control of the FIG. 6 clutch is identical with that of the FIGS. 1 and 3 clutches.

I claim:

1. An oil pressure actuated clutch comprising a plurality of annular, friction plates movable between engaged and released positions, a fixed, annular piston, a cylindrical shell including radial end walls slidably related to and surrounding the piston and defining therewith annular engaging and release cylinders, means for supplying oil under pressure to the engaging cylinder for actuating one of the end walls to engage the plates, means for continuously supplying oil under pressure to the release cylinder for actuating the other end wall in a direction enabling the release of the plates when the engaging pressure is interrupted, and means for continuously conducting a portion of the last named oil to the inner edges of the plates for cooling including a sump connecting chamber substantially axially coextensive with and from which the oil centrifugally and continuously flows over the friction plates.

2. An oil pressure actuated clutch comprising a plurality of annular friction plates movable between engaged and released positions, a fixed, annular piston, a cylindrical shell including radial end walls slidably related to and surrounding the piston and defining therewith annular engaging and release cylinders, means for supplying oil under pressure to the engaging cylinder for actuating one of the end walls to engage the plates, means for continuously supplying oil under pressure to the release cylinder for actuating the other end wall in a direction enabling the release of the plates when the engaging pressure is interrupted, and duct means connecting the release cylinder and the inner edges of the plates for continuously supplying oil thereto for cooling including a sump connecting chamber substantially axially coextensive with and from which the oil centrifugally and continuously flows over the friction plates.

3. An oil pressure actuated clutch comprising a plurality of annular, friction plates movable between engaged and released positions, a fixed, annular piston, a cylindrical shell including radial end walls slidably related to and surrounding the piston and defining therewith annular engaging and release cylinders, means for supplying oil under pressure to the engaging cylinder for actuating the one of the end walls to engage the plates, means for continuously supplying oil under pressure to the release cylinder for actuating the other end wall in a direction enabling the release of the plates when the engaging pressure is interrupted, and throttling duct means connecting the release cylinder and the inner edges of the plates for continuously supplying oil thereto for cooling including a sump connecting chamber substantially axially coextensive with and from which the oil centrifugally and continuously flows over the friction plates.

4. An oil pressure actuated clutch comprising a plurality of annular, friction plates movable between engaged and released positions, a fixed, annular piston, a cylindrical shell including radial end walls slidably related to and surrounding the piston and defing therewith annular engaging and release cylinders, means for supplying oil at a relatively high pressure to the engaging cylinder for actuating one of the end walls to engage the plates, means for constantly supplying oil to the release cylinder at a pressure relatively lower than the engaging higher pressure for biasing the other end wall in a direction enabling the release of the plates when the engaging pressure is interrupted, and means for continuously conducting a portion of the last named oil to the inner edges of the plates for cooling including a sump connecting chamber substantially axially coextensive with and from which the oil centrifugally and continuously flows over the friction plates.

5. An oil pressure actuated clutch comprising a plurality of annular, friction plates movable between engaged and released positions, a fixed, annular piston, a cylindrical shell including radial end walls slidably related to and surrounding the piston and defining therewith annular engaging and release cylinders, means for supplying oil at a relatively high pressure to the engaging cylinder for actuating one of the end walls to engage the plates, means for constantly supplying oil to the release cylinder at a pressure relatively lower than the engaging higher pressure for biasing the other end wall in a direction enabling the release of the plates when the engaging pressure is interrupted, and duct means connecting the release cylinder and the inner edges of the plates for continuously supplying oil thereto for cooling including a sump connecting chamber substantially axially coextensive with and from which the oil centrifugally and continuously flows over the friction plates.

6. An oil pressure actuated clutch comprising a plurality of annular, friction plates movable between engaged and released positions, a fixed, annular piston, a cylindrical shell including radial end walls slidably related to and surrounding the piston and defining therewith annular engaging and release cylinders, means for supplying oil at a relatively high pressure to the engaging cylinder for actuating one of the end walls to engage the plates, means for constantly supplying oil to the release cylinder at a pressure relatively lower than the engaging higher pressure for biasing the other end wall in a direction enabling the release of the plates when the engaging pressure is interrupted, and throttling duct means connecting the release cylinder and the inner edges of the plates for continuously supplying oil thereto for cooling including a sump connecting chamber substantially axially coextensive with and from which the oil centrifugally and continuously flows over the friction plates.

7. An oil pressure actuated clutch comprising a plurality of annular, friction plates movable between engaged and release positions, a shaft extending axially of the plates and connected to alternate ones of said plates, a sleeve through which the shaft extends having a fixed, annular piston, a cylindrical shell having radial end walls slidably related to and surrounding the piston and defining therewith annular engaging and release cylinders, cooperating passage means in the shaft and sleeve for supplying oil under pressure to the engaging cylinder for actuating one of the end walls to engage the plates, the other end wall being spaced from the sleeve to define an annular passage communicating with and through which pressure oil is supplied to the release cylinder for continuously actuating said other end wall in a direction enabling the release of the plates when the engaging pressure is interrupted, and means for continuously conducting a portion of the last named oil to the inner edges of the plates for cooling including a sump connecting chamber substantially axially coextensive with and from which the oil centrifugally and continuously flows over the friction plates.

8. An oil pressure actuated clutch comprising a plurality of annular, friction plates movable between engaged and release positions, a shaft extending axially of the plates and connected to alternate plates, a sleeve through which the shaft extends having a fixed, anular piston, a cylindrical shell having radial end walls slidably related to and surrounding the piston and defining therewith annular engaging and release cylinders, the shaft being recessed to define with the sleeve an annular passage, first and second passages in the sleeve respectively connecting the annular passage with the engaging cylinder and the outer surface of the sleeve, collector ring means surrounding the sleeve and arranged respectively to supply oil at a relatively high pressure through the second passage to the engaging cylinder for actuating the associated piston to engage the plates and oil at a relatively low pressure to the release cylinder for continuously biasing the associated piston in a direction enabling the release of the plates when the engaging pressure is interrupted, and means for continuously conducting a portion of the last named oil to the inner edges of the plates for cooling.

9. A clutch comprising a plurality of annular, friction plates movable between engaged and released positions, means for engaging the plates, a fixed annular piston, a cylindrical shell having a radial end wall slidable relative to and surrounding the piston and defining a cylinder therewith, the shell being connected to the engaging means, means for continuously supplying oil under pressure to the cylinder for actuating the end wall in a direction enabling release of the plates when the engaging means is inoperative, and means for conducting a portion of the oil to the inner edges of the plates for cooling including a sump connecting chamber substantially axially coextensive with and from which the oil centrifugally and continuously flows over the friction plates.

10. An oil pressure actuated clutch as defined in claim 1 wherein the engaging and release cylinders are included in an oil circuit which otherwise comprises a pump, a two-position, control valve having a position for continuously directing oil to the release cylinder and another position for additionally directing oil to the release and engaging cylinders, and series flow related, pressure regulating valves in back pressuring relation on the output side of the control valve for determining a higher pressure in the engaging than in the release cylinder, the oil for the release cylinder being continuously tapped between the pressure regulating valves.

References Cited in the file of this patent

UNITED STATES PATENTS

| | | |
|---|---|---|
| 2,178,017 | Fedden | Oct. 31, 1939 |
| 2,237,647 | Willians | Apr. 8, 1941 |
| 2,398,806 | Schneider | Apr. 23, 1946 |
| 2,483,521 | Blanchette | Oct. 4, 1949 |
| 2,518,016 | Johnson | Aug. 8, 1950 |
| 2,632,544 | Hockert | Mar. 24, 1953 |
| 2,640,373 | Jandasek | June 2, 1953 |
| 2,675,102 | Robinson | Apr. 13, 1954 |
| 2,690,248 | McDowall | Sept. 28, 1954 |
| 2,838,913 | Peterson | June 17, 1958 |

FOREIGN PATENTS

| | | |
|---|---|---|
| 137,220 | Great Britain | Jan. 8, 1920 |
| 579,061 | Germany | June 21, 1933 |
| 144,355 | Sweden | Mar. 2, 1954 |